US009264391B2

(12) United States Patent
Castera et al.

(10) Patent No.: US 9,264,391 B2
(45) Date of Patent: Feb. 16, 2016

(54) COMPUTER IMPLEMENTED METHODS AND APPARATUS FOR PROVIDING NEAR REAL-TIME PREDICTED ENGAGEMENT LEVEL FEEDBACK TO A USER COMPOSING A SOCIAL MEDIA MESSAGE

(71) Applicant: Buddy Media, Inc., San Francisco, CA (US)

(72) Inventors: Richard P. J. Castera, Jamaica, NY (US); Camden K. Daily, Brooklyn, NY (US); Christopher A. Jaynes, Brooklyn, NY (US); Katrina L. Santos, New York, NY (US)

(73) Assignee: salesforce.com, inc., San Francisco, CA (US)

(*) Notice: Subject to any disclaimer, the term of this patent is extended or adjusted under 35 U.S.C. 154(b) by 289 days.

(21) Appl. No.: 13/729,509

(22) Filed: Dec. 28, 2012

(65) Prior Publication Data
US 2014/0122622 A1    May 1, 2014

Related U.S. Application Data

(60) Provisional application No. 61/721,333, filed on Nov. 1, 2012.

(51) Int. Cl.
*H04L 12/58* (2006.01)
*G06Q 50/00* (2012.01)
*G06Q 30/02* (2012.01)
*G06Q 10/06* (2012.01)

(52) U.S. Cl.
CPC .......... *H04L 51/32* (2013.01); *G06Q 10/06375* (2013.01); *G06Q 30/02* (2013.01); *G06Q 30/0201* (2013.01); *G06Q 30/0202* (2013.01); *G06Q 50/01* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

"Adobe Updates Its Social Marketing Tools to Predict the Popularity of Your Facebook Post", TechCrunch, Apr. 23, 2013 [retrieved on May 6, 2013 from Internet at http://techcrunch.com/2013/04/23/adobe-social-predictions/], 4 pages.

(Continued)

*Primary Examiner* — Chris Parry
*Assistant Examiner* — Caroline Jahnige
(74) *Attorney, Agent, or Firm* — Weaver Austin Villeneuve & Sampson LLP

(57) ABSTRACT

Disclosed are methods, apparatus, systems, and computer readable storage media for providing near real-time feedback when a user is composing a social media message. The feedback can indicate a predicted level of engagement with the social media message by other users of a social networking system. In some implementations, a prediction model is used to determine a predicted engagement score, which is an approximation of the predicted level of engagement with the social media message by the other users. A computing device can be configured to display a graphical representation of the predicted engagement score in a user interface at which the social media message is being composed.

17 Claims, 11 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0189733 A1* | 8/2008 | Apostolopoulos ............ 725/28 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0055128 A1* | 2/2013 | Muti et al. ............... 715/769 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0040277 A1* | 2/2014 | Asur et al. ............... 707/748 |
| 2014/0289389 A1* | 9/2014 | George et al. ............. 709/224 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

\* cited by examiner

COMPUTER IMPLEMENTED METHODS AND APPARATUS FOR PROVIDING NEAR REAL-TIME PREDICTED ENGAGEMENT LEVEL FEEDBACK TO A USER COMPOSING A SOCIAL MEDIA MESSAGE

PRIORITY AND RELATED APPLICATION DATA

This patent document claims priority to commonly assigned U.S. Provisional Patent Application No. 61/721,333, titled "Computer Implemented Methods and Apparatus for Providing Near Real-Time Predicted Engagement Level Feedback to a User Composing a Social Media Message", by Castera et al., filed on Nov. 1, 2012, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for assisting users of social network data in composing social media messages.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for providing near real-time predicted engagement level feedback to a user composing a social media message. These drawings in no way limit any changes in form and detail that may be made by one skilled in the art without departing from the spirit and scope of the disclosed implementations.

DETAILED DESCRIPTION

Figure 1A:
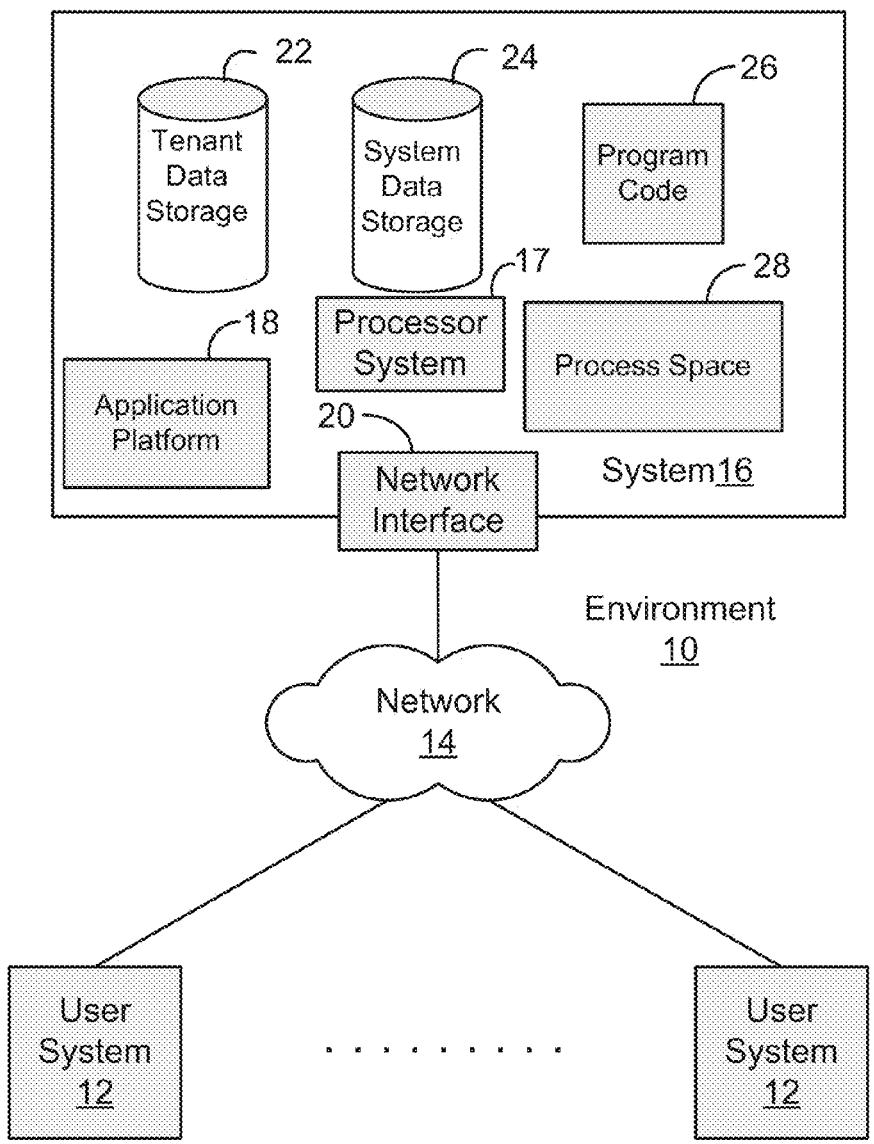
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for providing near real-time feedback to a user of an online social network, also referred to herein as a social networking system, when the user is composing a social media message. The feedback can indicate a predicted level of engagement by other users of the social networking system with the social media message being composed. The predicted level of engagement can be an estimate of whether and how users will react to and/or interact with the social media message. For instance, the predicted level of engagement can estimate whether and how many users are likely to read the message, comment or publish other online commentary about the message, tweet or re-tweet the message, share the message with other users, etc. Providing a predicted level of engagement when composing a message can help users of online social networks to compose social media messages that are more likely to attract many other users to engage with the messages by reading them, commenting on them, writing about them, sharing them with others, etc.

One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted social media messages or can otherwise be generated in response to user actions or in response to events. Examples of social media messages are described in greater detail below.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Online social network feeds and messages are quickly becoming a primary source of information consumed by many computer users on a daily basis. Consequently, users who compose posts, comments, and other social media messages are often interested in taking advantage of the online social network space to draw other users into engaging with their messages. Users who are involved in advertising or marketing campaigns on online social networks may be particularly interested in how well-received their targeted messages are and to what extent other users are engaging with their messages by, for example, viewing, liking, disliking, commenting, or sharing the messages.

One recurrent problem in tracking the engagement level of social media messages by other users is that the composing user typically cannot find out how engaging her post, comment, tweet, etc. will be until after the post is submitted to one or more feeds, published in the feed(s), and at least several hours elapse during which engagement data can be gathered. It can take even longer for the data to be analyzed. Moreover, when a post is found to draw lower-than-expected engagement from other users, the composing user may not be able to isolate the reasons for the lower-than-expected engagement. Even if such reasons are identified, it is too late to revise the original post that was submitted. Often, reasons remain unknown using conventional techniques, and the user thus may not be able to compose her next social media message in such a way as to improve engagement by other users.

Some of the disclosed implementations provide to the user feedback regarding whether a recent change that the user has made to a social media message, while the message is being composed, is predicted to increase or decrease the engagement level by other users with the social media message.

In some implementations, machine learning capabilities can be trained against a large corpus of historical data to predict the engagement of a social media post while a user is still composing it. There are many attributes of a social media message that can be accounted for when a user is composing a new post to send out, such as the following when composing a post for Facebook® or Twitter®:

Post author
  Scheduled day of year, day of month, and day of week for publishing post
  Scheduled time for publishing post
  Facebook® page ID or Twitter® handle
  Retweet statistics
  Number of Twitter® followers
  Facebook® page industry classification
  Facebook® page location targeting
  Message length
  Number of links included in post
  Domains of included links
  Attachment type
  Text content of message All of the above attributes can influence how well a post will be received by various recipient users. Machine learning can be applied to use numerical engagement levels—which can be calculated in some implementations by summing the number of likes, dislikes, shares, comments, views, and the like—of previous posts having various attributes such as those listed above. A prediction model can compare the set of attributes above for a post being composed with shared attributes of past posts to use past engagement levels to approximate and predict what the engagement will be for the post being created, and give the user feedback regarding the predictions while the user is composing the message. The approximation can vary depending on how many attributes are shared by the current post with past posts or other similar messages. In short, some of the disclosed implementations use past performance of messages to predict future performance of a new post before the post is submitted.

In some implementations, users can obtain real-time insight and feedback while they are composing their messages. They do not have to wait to see how well their message was received days later; they can actively hone the content of their message with a degree of certainty before other users on the online social network even see it.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
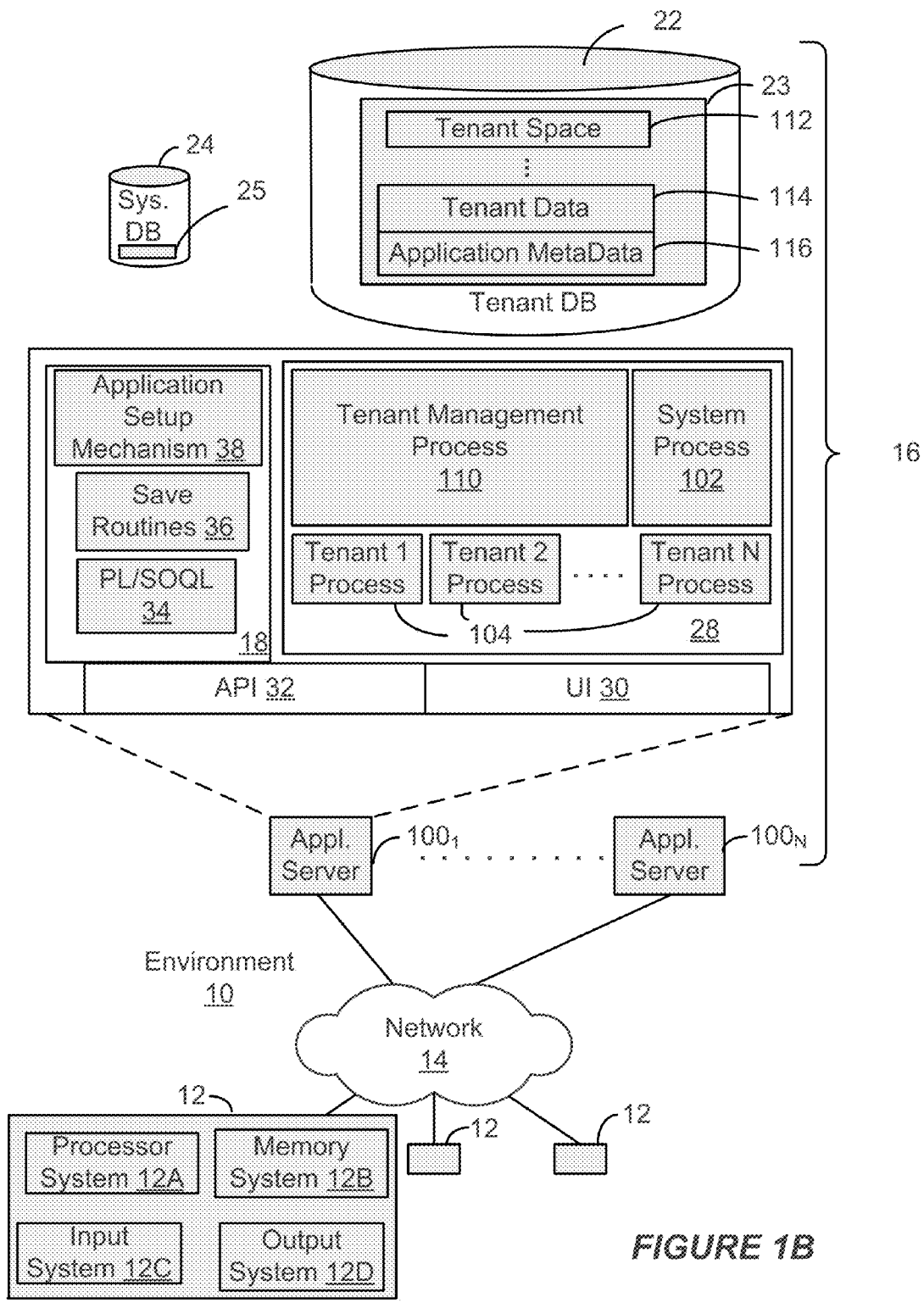
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle □databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
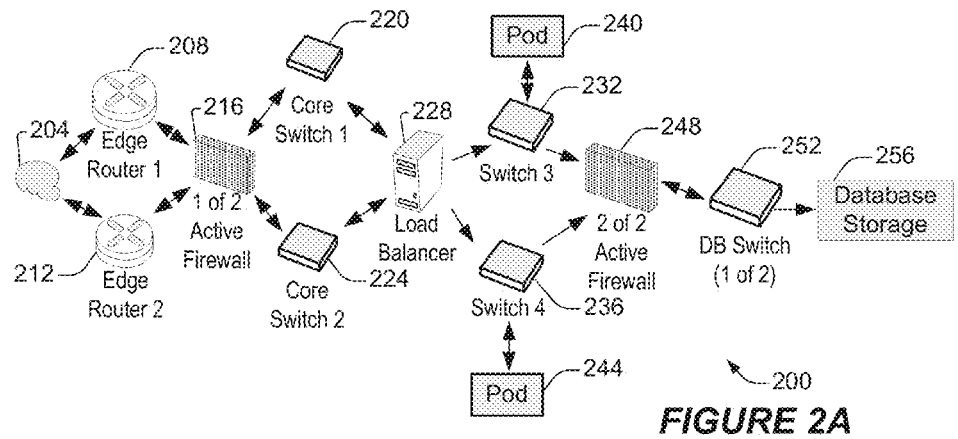
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
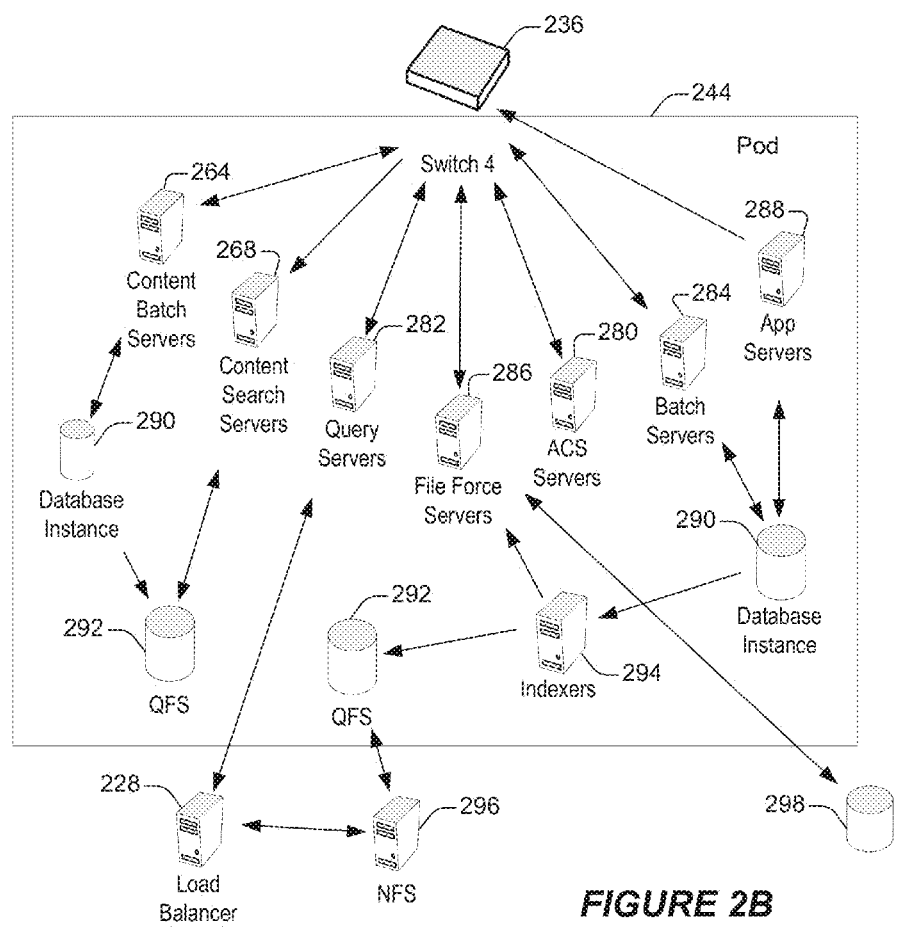
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-10. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Providing Near Real-Time Predicted Engagement Feedback

Figure 3:
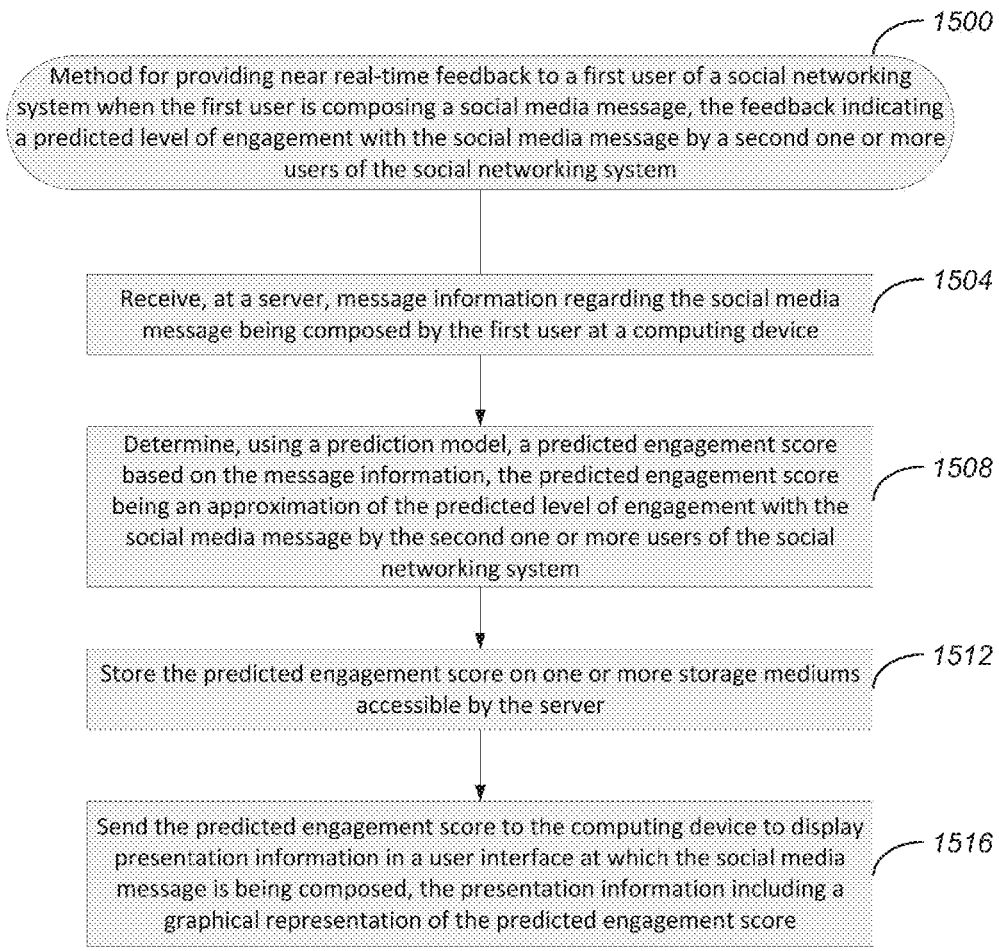
FIG. 3 shows a flowchart of an example of a method 1500 for providing to a user near real-time feedback indicating a predicted engagement level with a social media message for an online social network, performed in accordance with some implementations.

FIG. 3 shows a flowchart of an example of a computer implemented method 1500 for providing near real-time feedback to a user regarding the predicted level of engagement with a social media message, while the user is composing the social media message at a user's computing device. FIG. 3 is described with reference to the examples of FIGS. 6-9.

In FIG. 3, at block 1504, message information regarding the social media message being composed by the user at the user's computing device is received at another computing device such as a server. In one example, an app server 288 of FIG. 2B includes one or more processors configured to perform part or all of blocks 1504-1516 of method 1500. In other instances, one or more additional servers may retrieve, process, and exchange data to cooperate with the app server 288 to perform the blocks. When a user is composing a social media message, the message information can be received by an application server 100 over a data network 14 from the user operating a user system 12 as shown in FIGS. 1A and 1B. In other instances, such message information may be received from a proxy server on behalf of a user or other data source. Various implementations of method 1500 are possible, such that any of the servers depicted in FIGS. 1A, 1B, 2A, and 2B can be configured to receive and process message information in accordance with method 1500.

Social media messages can include, by way of example: posts, comments, updates to a user's status, and hyperlinks to social network data or other network data, such as various documents or web pages on the Internet. Posts include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

The message information that is transmitted to and received at the server(s) performing method 1500 may include one or more message information attributes, including one or more of: part or all of the content of the social media message; the length of the social media message; the type of the social media message, such as a blog post, comment, tweet, etc.; an attachment of the social media message; a timestamp of the social media message; the scheduled date or time for sending the social media message; a link in the social media message; a count of the number of links in the social media message; the identity of the user composing the message; the identity of the recipient of the message; and the subject matter of the social media message. These and other message information attributes may affect the level of engagement of other users with the social media message. For example, a social media message with a length beyond a certain number of characters may cause the social media message to be less engaging. As another example, a social media message containing particular textual words or phrases may cause more users to engage with the message.

Other message information attributes that could affect engagement are: the scheduled day of the week for sending the social media message; location targeting of the social media message; number of followers of the author composing the social media message; industry classification of the social media message; domains of links included in the social media message; tags associated with the social media message; categories associated with the social media message; and the type of an attachment of the social media message.

In some implementations, the message information that is transmitted may be the entire data of the message as composed, including any attachments, tags, categories, publishing time information, and the like. In another implementation, the message information that is transmitted may be the text that was most recently added since the last time that message information was transmitted. If the most recent change was the addition of a tag or category or a change in the publishing date, the transmitted message information may be the added tag, the added category, or the new publishing date. In another implementation, the computing device may store a version of the social media message each time message information is transmitted to the server. In such an implementation, the computing device may compare the social media message being composed with the previous version of the social media message, and the message information that is transmitted may contain only the differences between the message being composed and the previous version of the message.

Figure 6:
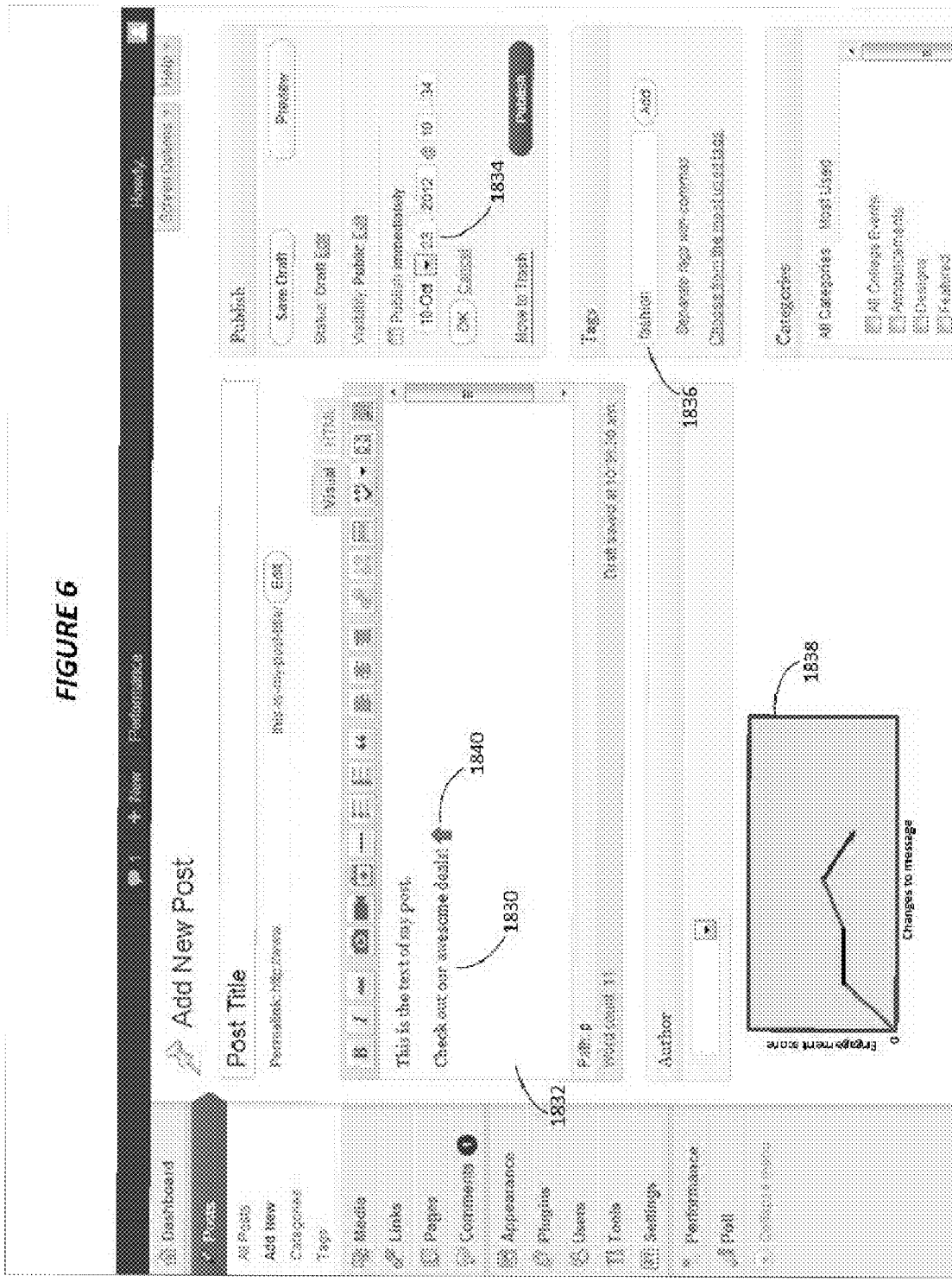
FIG. 6 shows an example of a presentation of positive feedback regarding a predicted engagement level of a social media message in a graphical user interface (GUI) as displayed on a display device, according to some implementations.
Figure 8:
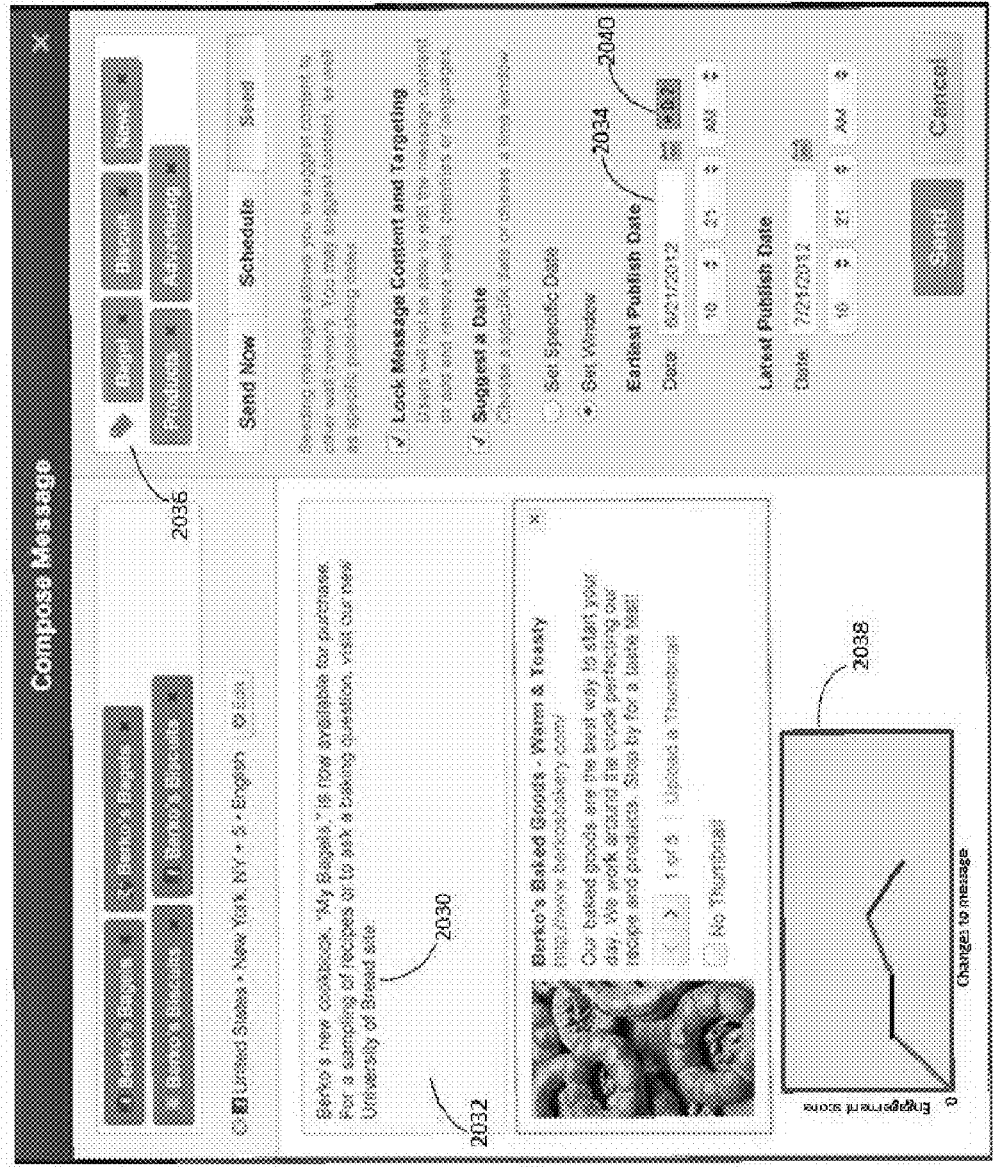
FIG. 8 shows an example of a presentation of positive feedback regarding a predicted engagement level of a social media message in a GUI as displayed on a display device, according to some implementations.

By way of example, FIGS. 6 and 8 show examples of different presentations of positive feedback regarding a predicted engagement level of a social media message in a graphical user interface (GUI) as displayed on a display device, according to some implementations. In both FIGS. 6 and 8, the user may enter or select message content and/or various message information attributes of the message information, and the message information is transmitted to and received at the server.

For example, in FIG. 6, the user may enter text content 1830 into a textbox 1832 on a social media website to compose a post to be published to a weblog or a feed of an online social network, or the user may set other message information attributes related to the post, such as the scheduled date of publication 1834 or tags 1836 indicating the subject matter of the post. In this example, the user types the text content 1830 "Check out our awesome deals!" into the textbox 1832. The user in this example has also included a "fashion" tag 1836 for this post to indicate that the post is related to the topic of fashion, and the user has set a date 1834 for when the post will be published.

In FIG. 8, the user may enter text content 2030 into a textbox 2032. The user may also select tags 2036 associated with the post, or schedule a date 2034 for when the post will be published. Alternatively, the user may also select the actual time of the day of publication of the post. These message information attributes may be part of the message information that is ultimately received at the server or servers performing method 1500, at block 1504.

In some implementations, the message information can be transmitted from the computing device to the application server at fixed time intervals while the user is composing the social media message, for instance, every five seconds or every ten seconds. In another implementation, the message information may be transmitted to the server whenever the user pauses for a period of time, for instance, two seconds, while composing the message. In yet another implementation, the message information may be transmitted to the server whenever the user enters a particular keystroke, such as a return carriage or a period, or whenever the user makes changes to particular attributes of the social media message, such as changing the scheduled time for publication, adding a tag or category to the message, attaching a file, or changing the recipient or author of the message. For example, referring back to FIG. 6, adding the "fashion" tag 1836 to the post or setting the publishing date 1834 of the post may trigger block 1504 to occur. In yet another implementation, the message information can be received at the server whenever the user enters any keystroke or makes any change to the message contents or any message attribute.

In some implementations, at block 1504 of method 1500, the message information may be transmitted from the computing device to the server via an Asynchronous JavaScript and XML ("AJAX") call made while the user is composing the social media message.

Returning to FIG. 3, at block 1508, in some implementations, the server determines, based on the message information received from the computing device, the predicted level of engagement with the social media message by other users of the social networking system. This determination is made using a prediction model that generates, based on the message information, a predicted engagement score that approximates the predicted level of engagement that the social media message will draw from other users. In some implementations, the predicted engagement score is a numerical approximation.

In one implementation, the prediction model may contain a set of rules that identifies particular message information attributes as predicted to increase or decrease the engagement level of a social media message. The prediction model may then use this set of rules to determine predicted engagement scores for social media messages. For example, the set of rules may indicate that social media messages published on Monday tend to draw more engagement than messages published on other days of the week. The prediction model using the set of rules could then assign a higher predicted engagement score to a message scheduled to publish on Monday than the prediction model would assign to a message scheduled to publish on, say, Thursday. In other implementations, detailed further below, machine learning algorithms may be used to determine and adjust the set of rules that the prediction model uses to determine the engagement scores for the social media messages.

Another example of various message information attributes that can increase the engagement level of a social media message is the day of the week that a user posts a message on a particular subject matter. For example, a user message having to do with technology may draw a higher level of engagement if it is posted on Monday, as opposed to any other day of the week. Yet another example may be the length of a link included in the message. Based on these message information attributes, the prediction model may then assign a higher score for a social media message on the topic of fashion if the message is scheduled to publish on Thursday, rather than Sunday. In another example, a social media message that contains calls to action, such as "Click this" or "Like this" or "Caption this" may also draw a higher level of engagement, and the prediction model may assign a higher score for social media messages that contain such text in their contents.

In FIG. 3, at block 1512, the predicted engagement score is stored on one or more storage mediums accessible by the server. In one example, the predicted engagement score may be stored on tenant data storage 22 and/or system data storage 24 of the database system 16 of FIG. 1B, where the tenant data storage 22 and system data storage 24 are accessible by the application server 100. Storing the predicted engagement score may allow the server to compare the predicted engagement scores of different revisions of the social media message to provide feedback regarding whether and how a particular change to the content of the social media message affects the predicted engagement level of the message. Moreover, storing the predicted engagement score allows the server to generate information for a graph, further discussed below, to be displayed on the computing device.

Also, storing the predicted engagement score may allow the server to further calibrate the prediction model by comparing the predicted engagement score of a published social media message with the actual engagement level of the message.

At block 1516, the server sends the predicted engagement score to the user's computing device to display presentation information in the user interface at which the social media message is being composed. In some instances, the presentation information includes a graphical representation of the predicted engagement score. In one example, after the application server 100 of FIGS. 1A and 1B determines the predicted engagement score and stores the score on a storage medium accessible by the server, the application server 100 may send the predicted engagement score back to the user system 12 of FIGS. 1A and 1B to be displayed at the user system 12. Various implementations of method 1500 are possible, such that any of the servers depicted in FIG. 2B can be configured to send the predicted engagement score in accordance with method 1500.

As illustrated in FIG. 6, the presentation information may include a graphical indicator 1840 proximate to textbox 1832 where the social media message is composed. In one implementation, illustrated in FIG. 6, the graphical indicator 1840 includes an arrow or a line pointing up or down to indicate whether the most recent change to the social media message increases or decreases the predicted level of engagement. If the most recent change to the social media message increases the predicted level of engagement, the arrow may be an upward pointing green arrow; and if the most recent change decreased the predicted level of engagement, the arrow may be a downward pointing red arrow. Alternatively, the graphical indicator may be a thumbs up graphic or a thumbs down graphic or similar graphic that indicates to the user whether the most recent change increased or decreased the predicted level of engagement of the social media message. Moreover, if the most recent change did not change the predicted engagement score, then the graphical indicator may be a horizontal line or a zero or similar graphic that indicates to the user that the most recent change did not change the predicted level of engagement of the social media message. The graphical indicator may offer to users near real-time insight and feedback as they compose their social media messages, allowing them to actively hone their content and have a degree of certainty about the level of engagement that their content will draw before end users even see it. The real-time feedback can also give users insight into which message information attributes tend to increase engagement or decrease engagement with their social media content.

In another implementation, a graphical indicator indicating an increase or a decrease in the predicted engagement score many only be displayed to the user when the increase or decrease is of at least a designated magnitude, for example 0.5 points. In such an implementation, no indicator would be shown for changes that have a negligibly small effect on the predicted engagement score. For example, if the most recent change to the social media message resulted in a decrease of 0.1 points in the predicted engagement score, in this implementation, no graphical indicator would be displayed.

In yet another implementation, the user interface may display a specific suggestion regarding certain message information attributes of the social media message, suggesting that the user change or select a particular message information attribute to increase the predicted engagement level of the message. For example, if a user adds "fashion" as a tag or category, and the prediction model contains rules specifying that a social media message on the subject matter of fashion will draw a higher level of engagement if it is published on Saturday, then the user interface may display the suggestion: "Blog posts on fashion may be better received if published on Saturday." As another example, if a user adds text for an emoticon, ":)", and the prediction model contains rules that specify that a message with the text "=)" tends to draw a higher engagement level than a message with the text ":)", then the suggestion may read: "Wall posts with '=)' may be better received than wall posts with ':)'". In another example, the prediction model may contain rules indicating that messages with a question may generate higher comment rates than non-question posts, in which case the suggestion may read: "Add a question to generate more comments." Suggestions such as these may give a user real-time feedback and suggestions about how to compose the social media message to draw a higher engagement level.

Figure 7:
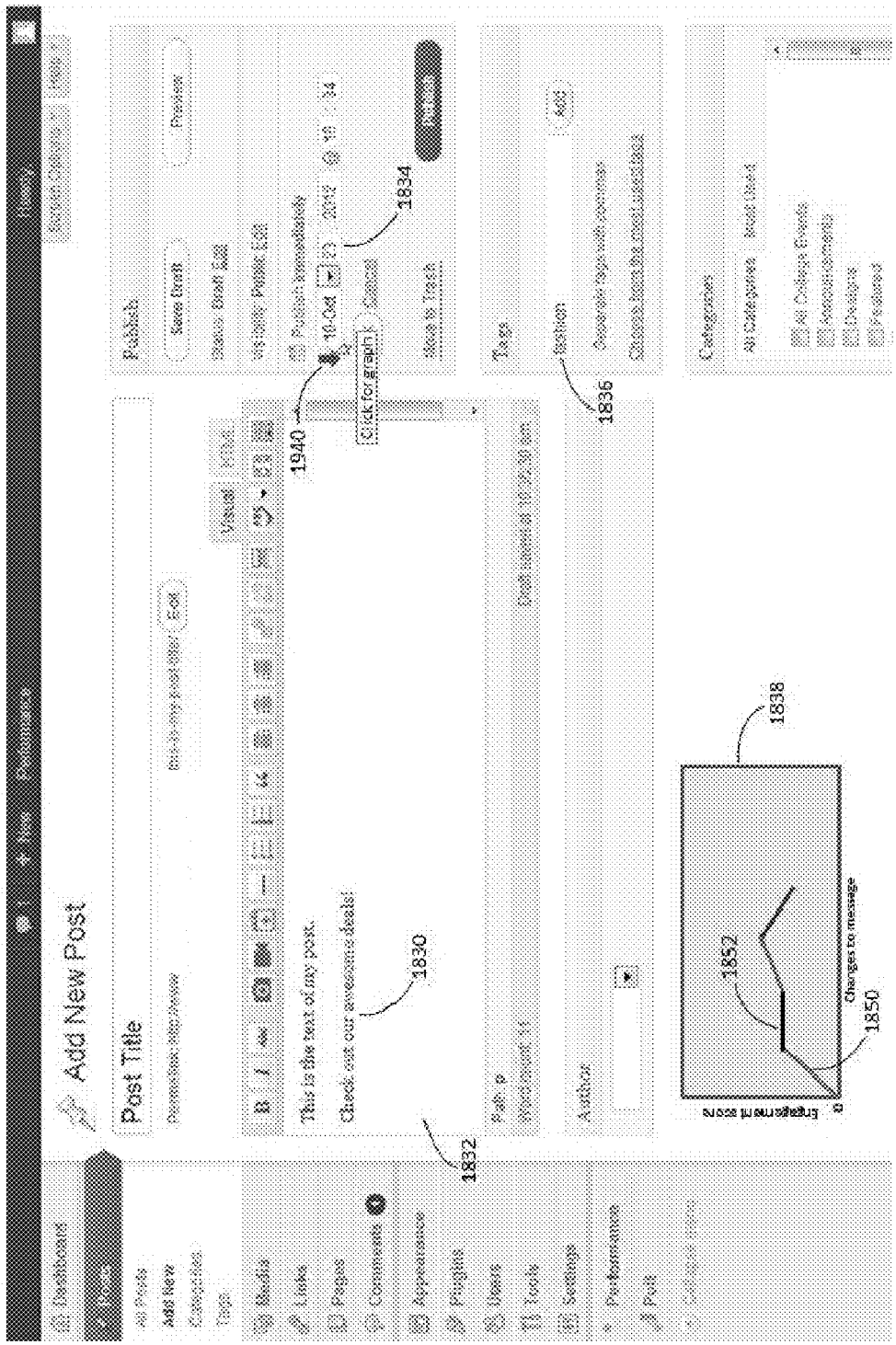
FIG. 7 shows an example of a presentation of negative feedback regarding a predicted engagement level of a social media message in a GUI as displayed on a display device, according to some implementations.

As an example, FIG. 7 shows an example of a presentation of negative feedback regarding a predicted engagement level of a social media message in a GUI as displayed on a display device, according to some implementations. In FIG. 7, a graphical indicator 1940 appears next to the publication date of the post. The graphical indicator 1940, which is a downward arrow, indicates that the user's most recent change to the publication date caused the predicted engagement score for the social media message to go down.

As another example, illustrated in FIG. 8, a graphical indicator 2040 may be a positive or a negative number that indicates not only whether the most recent change to the social media increased or decreased the predicted engagement score of the social media message, but also the numerical change to the predicted engagement score caused by the most recent change to the social media message. For example, in FIG. 8, the user may change the "Earliest Publish Date" field 2034 for a social media message, and the server may return the predicted engagement score for the social media message with this most recent change. The user's computing device then may display a "+0.2" as the graphical indicator 2040 to indicate that the predicted engagement score increased by 0.2 points as a result of the user's change to the "Earliest Publish Date." Also, referring to FIG. 6, the upward-pointing green arrow could be replaced with a positive number to indicate by how much the predicted engagement score increased when the user entered the text content 1830: "Check out our awesome deals!"

In another implementation, as illustrated in FIG. 7, the presentation information may include a graph 1838 that presents one or more previous predicted engagement scores for the social media message. The graph 1838 may present to the user, for example, the predicted engagement scores for the four most recent changes to the message as a contiguous line that slopes up or down along the graph 1838 depending on how the predicted engagement score changes over the one or more previous changes to the social media message. The graph 1838 may be superimposed over the textbox 1832 where the most recent change was made, or may be displayed adjacent to the textbox 1832, in various implementations. This feature allows a user to see on a broader scale how the changes to the content change the predicted engagement of the message by other users.

In FIG. 7, for example, the user has changed the publishing date for the post to Oct. 23, 2012, and the graphical indicator 1940 indicates that this change lowered the predicted engagement score for the social media message. Also, the graph 1838 is displayed adjacent to the textbox 1832, and the graph 1838 indicates how the last four changes to the social media message affected the predicted engagement score for the social media message. The first upward-sloping segment 1850 of the graph 1838 indicates that the first change increased the predicted engagement score; the second flat segment 1852 of the graph 1838 indicates that the second change did not affect the predicted engagement score; and so on.

In some implementations, the graph 1838 may automatically appear and refresh with the most recent change every time a change is made to the message. In other implementations, the graph 1838 may not appear automatically, but may appear in response to user input at the computing device, as discussed below.

In some implementations, the graph may show every change to the social media message up to that point. In another implementation, the graph may show just the most recent designated number of changes, such as the last five changes to the social media message.

In one implementation, hovering over a segment of the graph may cause a textbox to appear superimposed on the graph, the textbox displaying to the user the change to the social media message that caused the change in predicted engagement represented by that segment of the graph. If the most recent change was a change to the text contents of the message, the textbox may show the text that was added or deleted from the message. If the most recent change was a change to another attribute of the social media message, such as the publishing date or time, or a tag or category, the textbox may display the attribute that was changed: for example, "Added tag: Fashion" or "Changed publishing date: Oct. 10, 2012."

Figure 4:
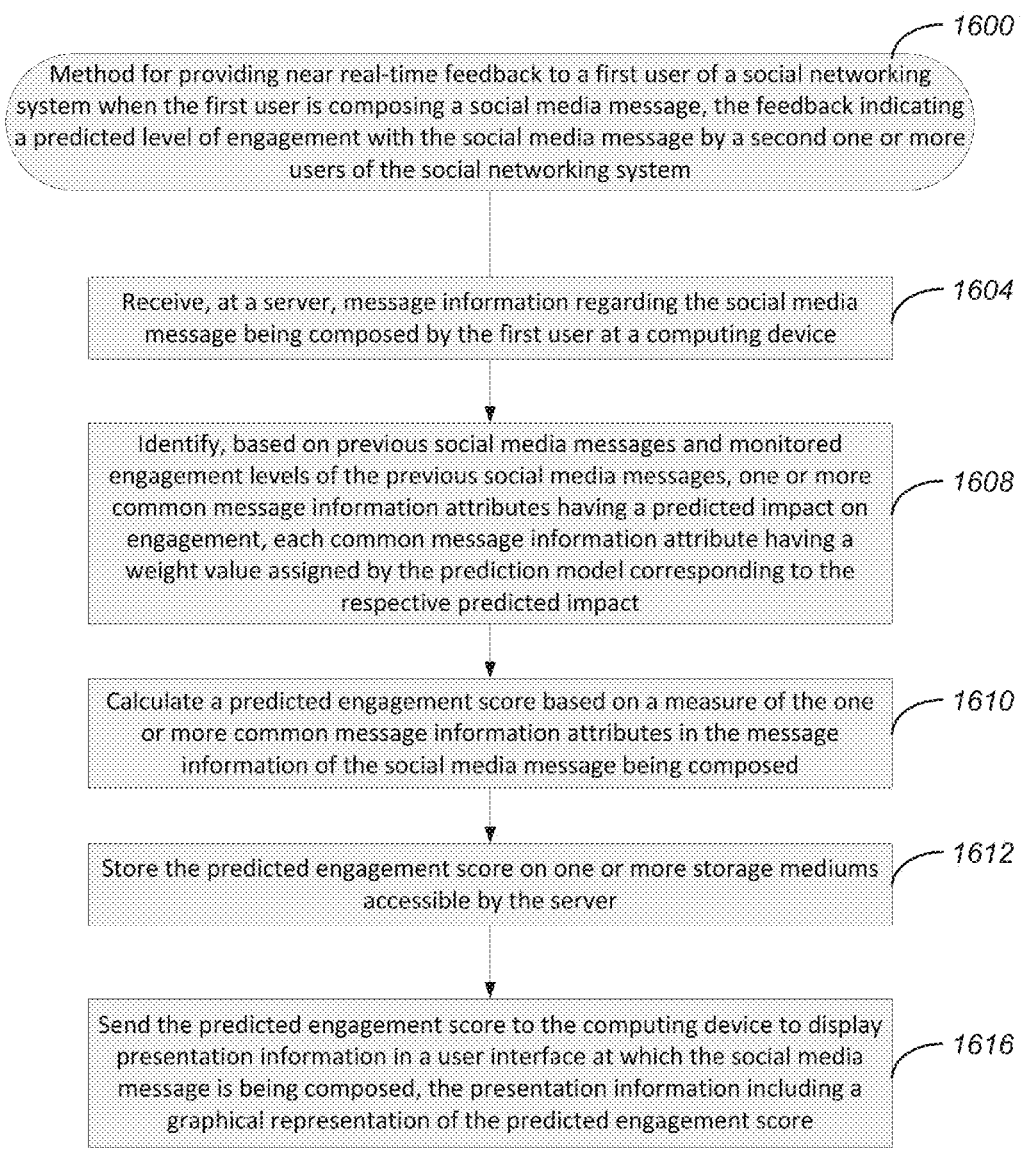
FIG. 4 shows a flowchart of an example of a method 1600 for providing to a user near real-time feedback indicating a predicted engagement level with a social media message for an online social network, performed in accordance with some implementations.

FIG. 4 shows a flowchart of an example of a method 1600 for providing to a user near real-time feedback indicating a predicted engagement level with a social media message while the user is composing the social media message for an online social network, performed in accordance with some implementations. At block 1604, message information regarding the social media message being composed by the user at the user's computing device is received at another computing device such as a server, as generally described above at block 1504 of method 1500.

In FIG. 4, at block 1608, the server identifies one or more common message information attributes that are predicted to have an impact on engagement with the social media message, each attribute having a weight value assigned by the prediction model corresponding to the respective predicted impact. The common message information attributes are identified based on previous social media messages and monitored engagement levels of the previous social media messages. In some implementations, the one or more common message information attributes and monitored engagement levels may be stored in the tenant data storage 22 or system data storage 24 of the system 16 of FIG. 1A, and accessible by the applications servers 100 of FIG. 1B.

The prediction model that the server uses may contain information about particular message information attributes that tend to increase the engagement level of a social media message when present in the social media message. Examples of message information attributes that may increase or decrease the engagement level of a social media message may include: the time of day that the message is published, any tags that are associated with the message, or the number of links in the message. The server, using the prediction model, parses the message information received from the user's computing device, identifying message information attributes known to affect engagement level.

In some implementations, the presence of a particular attribute may be given an approximate numerical value to be included in the calculation of the predicted engagement score. The values associated with different attributes may differ depending on how large of an impact the presence of an attribute may have on the engagement level of a message by other users. In some implementations, the numerical value associated with a particular attribute may be zero if the presence or absence of the attribute is predicted to have no impact on the engagement level of a message.

In another implementation, the prediction model may also use machine learning techniques to monitor the engagement levels of previous social media messages and analyze the message information attributes of those social media messages to adjust predictions of how those message information attributes will affect the engagement of another social media message. The engagement level of a particular social media message may be determined by one or more of: a number of likes, a number of dislikes, a number of shares, a number of comments, and a number of views, by way of example. For example, a high number of likes, shares, comments, and views and a relatively low number of dislikes may indicate a high level of engagement with the message. Conversely, a high number of dislikes along with a relatively low number of likes, shares, comments, and views may indicate a low level of engagement with the message.

Natural language processing algorithms based on statistical machine learning may be used to calibrate the prediction model so that the prediction model more accurately predicts how various changes to the message information of a social media message will affect the engagement level of the message. The prediction model can be trained on large sets of social media messages and can potentially achieve a level of predictive accuracy greater than what human observation and intuition can achieve.

Machine learning algorithms as used to implement the disclosed techniques take as input a large set of message information attributes, or "features," generated from input data. Based on the input data, a statistical machine learning model may make soft, probabilistic decisions based on attaching numerical weights to each input feature. These models are able to express the relative certainty of many different possible engagement outcomes rather than only one, which produces more reliable results. A prediction model based on machine-learning algorithms is able to automatically learn a set of rules for determining engagement scores for social media messages through analysis of a large corpus of input examples and their corresponding engagement levels as determined by a number of likes, dislikes, comments, shares, views, and the like. Using such algorithms allows the prediction model to automatically focus on the most common cases and give more weight to message information attributes that commonly increase engagement. Moreover, the prediction model can be made more accurate simply by supplying more input data to calibrate the weighted scores of various message information attributes.

In some implementations, a server may monitor the engagement level of a previous social media message that has been published, and the server may track the number of views, likes, dislikes, shares, and comments associated with that previous social media message in a designated period of time after publication of the social media message. In some implementations, the engagement level of a social media message may be represented by a score that comprises the sum of the number of views, number of likes, number of shares, and number of comments, less the number of dislikes. In other implementations, one or more of the number of views, number of likes, number of shares, number of comments, and number of dislikes may be weighted more or less in determining the engagement level of the social media message. In yet other implementations, other indicators of engagement with the social media message may be used in determining the engagement level of the message.

In some implementations, if the monitored engagement level is relatively high, then the server may identify the message information attributes of the previous social media message as tending to increase the predicted engagement level of a social media message. For example, a statistical prediction model may use the number of views, likes, shares, and comments of a social media message within a designated period of time as an indication of the probability that the message information attributes present in the social media message, either individually or in combination, will cause increased engagement with another social media message in which some or all of the message information attributes are present.

In some implementations, the prediction model, using machine learning techniques, may monitor the engagement levels of published social media messages to adjust the weight values given to various message information attributes that are found in the social media messages that the prediction model is monitoring. This monitoring and adjustment of weight values of message information attributes by the prediction model may allow the prediction model to more accurately predict the engagement level of future social media messages. For example, the prediction model may find that a number of messages that contain the text "Click this" tend to draw engagement levels that are higher than messages with similar content but without the "Click this" text. Based on this information, the prediction model can then identify "Click this" message text as an attribute that tends to increase the engagement level of a message, and adjust the weight value of that attribute in calculating the engagement scores of future social media messages.

In some implementations, the prediction model, as it monitors the engagement levels of previous social media messages, may find that one or more message information attributes has no impact on engagement. In such a case, the prediction model may adjust the weight value assigned to that attribute to be zero or an equivalent value that has would have no impact on the engagement score calculation for a social media message. As an example, the prediction model may initially determine that publishing a message on Monday is a message information attribute that has a positive predicted impact on engagement. Subsequently, based on continued monitoring of the engagement levels of other published social media messages, the prediction model may later find that, in fact, similar messages published on any day of the week tend to draw the same level of engagement. The prediction model may then find that the publishing day of the week of a message in fact has no effect on the engagement level of the published social media message. The prediction model in this example may then adjust the weight value assigned to that attribute to a value that would have no impact on the engagement score calculation of the prediction model.

A number of software suites containing machine learning algorithms may be used, including: RapidMiner, KNIME, Weka, Apache Mahout, mlpy, OpenCV, Orange, Shogun toolbox, ODM, LIONsolver, scikit-learn, Google Prediction API, and MCMLL.

In FIG. 4, at block 1610, the server calculates a predicted engagement score based on a measure of the message information attributes known to affect engagement level in the message information received from the computing device. In one implementation, the predicted engagement score may be a numerical approximation of the predicted engagement level of the message.

Based on the message information attributes identified in block 1608, the server may, in some implementations, determine if any of the identified message information attributes are present in the message information of the social media message being composed. The server may then use the weight values assigned to the identified attributes that are found to be in the message information of the social media message to calculate the predicted engagement score for the social media message as composed. In some implementations, since the weight values for the attributes may change as the prediction model monitors more published social media messages in block 1608, the predicted engagement score calculated at block 1610 may also change over time even when the message information is the same.

In FIG. 4, at block 1612, the predicted engagement score is stored on one or more storage mediums accessible by the server, as generally described above at block 1512 of method 1500.

In FIG. 4, at block 1616, the server sends the predicted engagement score to the user's computing device to display presentation information in the user interface at which the social media message is being composed, as generally described above at block 1516 of method 1500.

Figure 5:
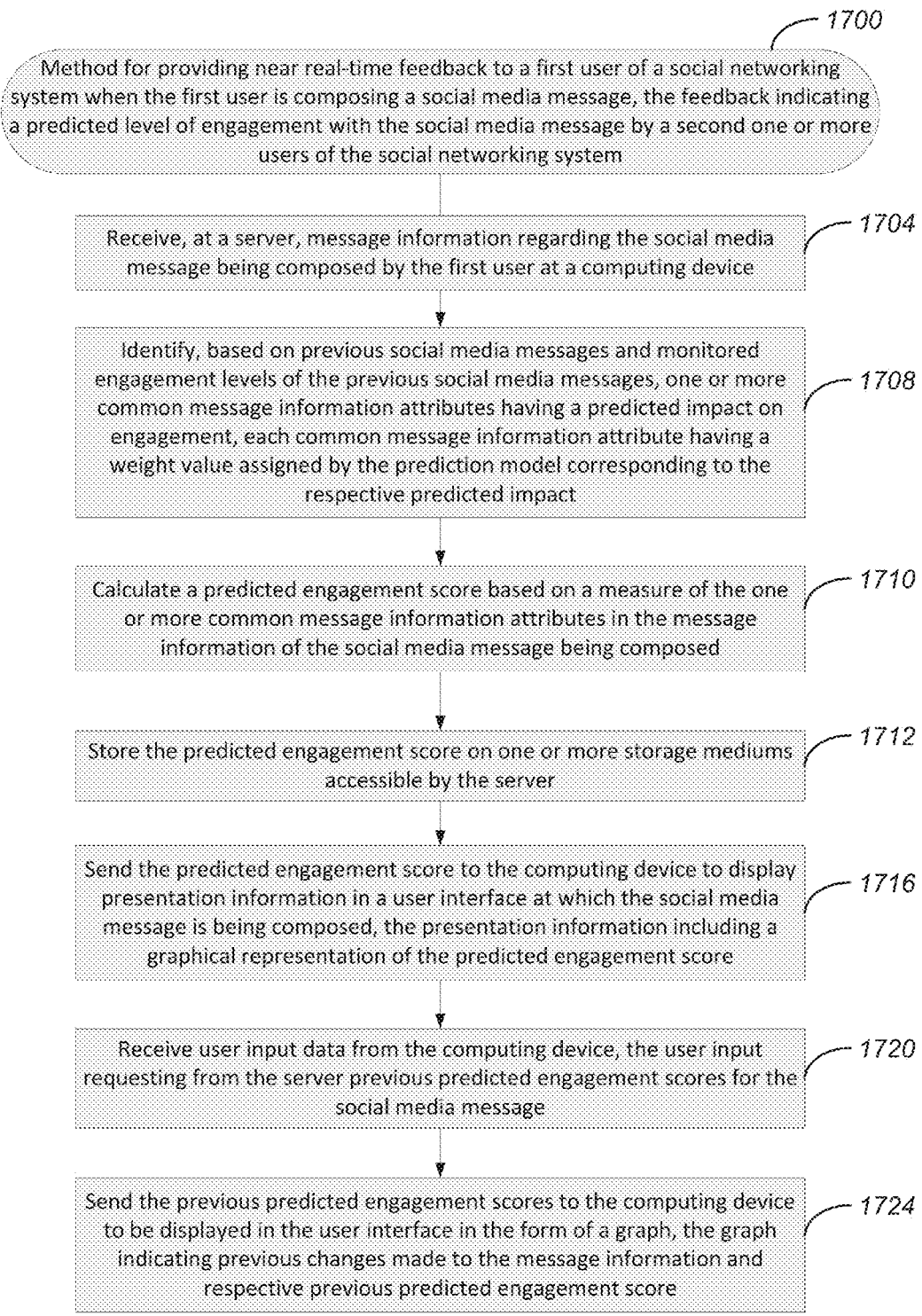
FIG. 5 shows a flowchart of an example of a method 1700 for providing to a user near real-time feedback indicating a predicted engagement level with a social media message for an online social network, performed in accordance with some implementations.

FIG. 5 shows a flowchart of an example of a method 1700 for providing to a user near real-time feedback indicating a predicted engagement level with a social media message for an online social network, performed in accordance with some implementations. FIG. 5 is described with reference to the examples of FIGS. 6-9. In FIG. 5, at block 1704, message information regarding the social media message being composed by the user at the user's computing device is received at another computing device such as a server, as generally described above at blocks 1504 and 1604 of methods 1500 and 1600.

In FIG. 5, at block 1708, the server identifies one or more common message information attributes having a predicted impact on engagement, each attribute having a weight value assigned by the prediction model corresponding to the respective predicted impact. The common message information attributes are identified based on previous social media messages and monitored engagement levels of the previous social media messages, as generally described above at block 1608 of method 1600.

In FIG. 5, at block 1710, the server calculates a predicted engagement score based on a measure of the message information attributes known to affect engagement level in the message information received from the computing device, as generally described above at block 1610 of method 1600.

In FIG. 5, at block 1712, the predicted engagement score is stored on one or more storage mediums accessible by the server, as generally described above at blocks 1512 and 1612 of methods 1500 and 1600.

In FIG. 5, at block 1716, the server sends the predicted engagement score to the user's computing device to display presentation information in the user interface at which the social media message is being composed, as generally described above at blocks 1516 and 1616 of methods 1500 and 1600.

In FIG. 5, at block 1720, the server receives user input data from the computing device requesting from the server previous predicted engagement scores for the social media message. In one example, the user system 12 of FIGS. 1A and 1B sends user input via the network 14 to the application server 100 requesting previous predicted engagement scores stored on either the tenant data storage 22 or the system data storage 24 of the system 16, accessible by the application server 100. Various implementations of method 1700 are possible, such that any of the servers depicted in FIG. 2B can be configured to receive the request from the user system 12 in accordance with method 1700.

In one implementation, the user input can request from the server one or more previous engagement scores calculated for previous versions of the social media message. FIG. 7 illustrates this implementation, where the computing device may display a graphical indicator 1940 proximate to the most recent change to the social message that the user can click on or select to view a graphical representation of the engagement scores calculated for previous changes to the social media message. For example, in FIG. 7, a prompt, "Click for graph," may appear when the user's mouse pointer hovers over the graphical indicator 1940. The user may click on the graphical indicator 1940, causing the server to send one or more previous predicted engagement scores to the computing device to be displayed to the user in the form of the graph 1838, which appears proximate to the textbox 1832, indicating the changes to the predicted engagement score caused by the past one or more changes to the social media message. Alternatively, the graph may appear superimposed over the textbox 1832 as well, or the graph may appear superimposed on top of the current page, using, for example, a Lightbox script.

Returning to FIG. 5, at block 1724, the server sends the requested scores to the computing device to be displayed in the user interface in the form of the graph 1838, where the graph indicates previous changes made to the message information and respective previous predicted engagement scores.

For example, if the previous three changes to the social media message were: 1) changing the scheduled day of publication to Monday, which decreased the predicted engagement score, 2) adding "Like this to check out our deals!" to the text of the post, which increased the predicted engagement score, and 3) adding an emoticon ":D", which increased the predicted engagement score, then the three engagement scores for the three changes would be sent to the computing device to be displayed in the graph 1838 indicating the changes to the message and the corresponding changes to the predicted engagement score. If the previous one or more changes to the social media message, for example, did not affect the predicted engagement score, then the graph may appear as a horizontal line indicating an unchanging predicted engagement score across the one or more previous changes.

In another implementation, the user may hover over an endpoint between two segments on the graph, and cause the user input display to display the social media message as composed at the moment of the change represented by that endpoint of the graph. For example, if the endpoint that the mouse pointer hovers over corresponds to an addition of text to the text contents, then the user input display may display in the textbox the text contents of the social media message at the moment of that change. The user input display may also display the scheduled publishing date and other attributes of the social media message as of the time of the change. This way, when the mouse pointer hovers over the various endpoints of the graph, the user input display will display the various versions of the social media message during its composition, and can give insight to the user as to which changes tended to increase or decrease the predicted engagement score for the social media message.

Figure 9:
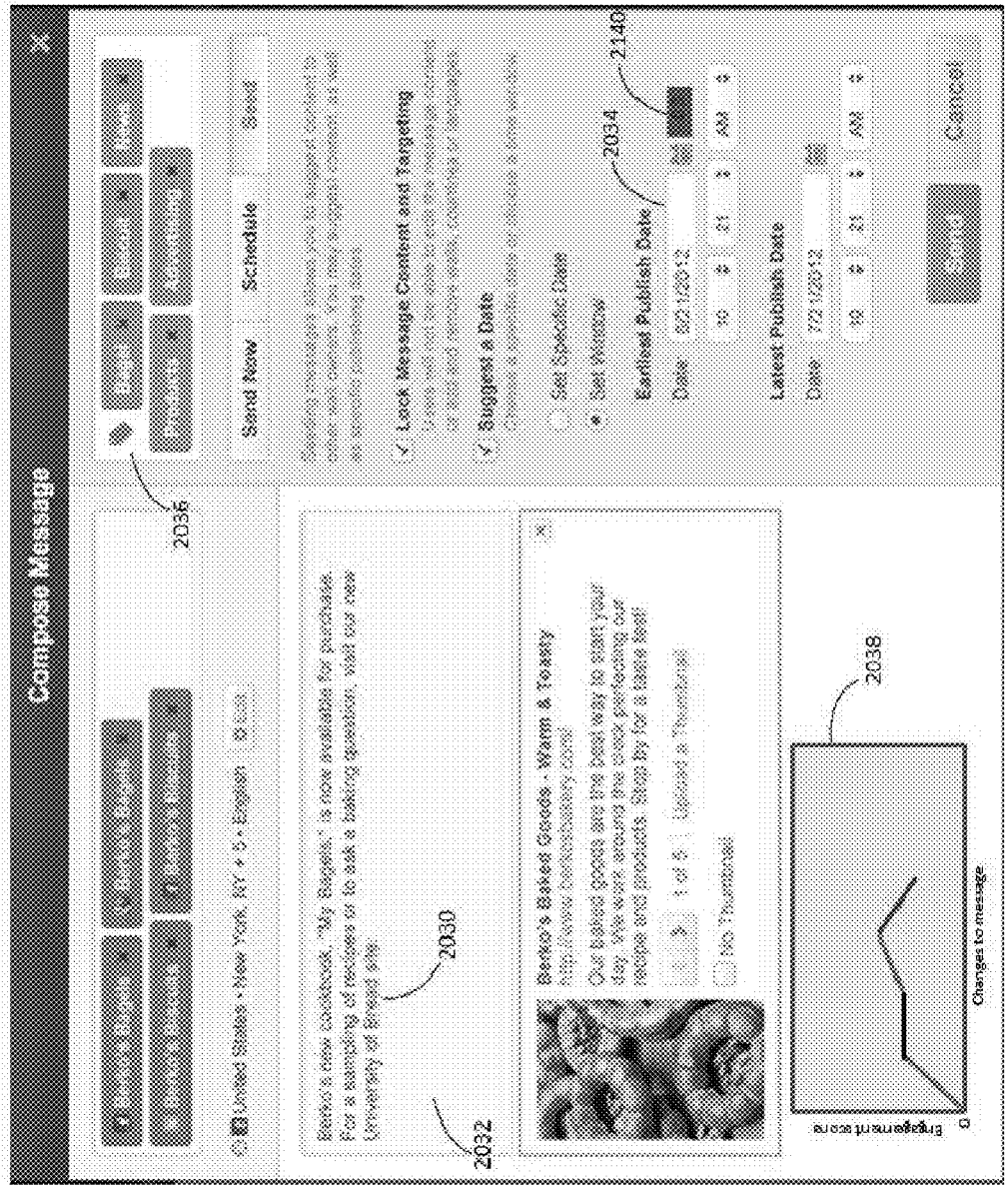
FIG. 9 shows an example of a presentation of negative feedback regarding a predicted engagement level of a social media message in a GUI as displayed on a display device, according to some implementations.

FIG. 9 shows an example of a presentation of negative feedback regarding a predicted engagement level of a social media message in a GUI as displayed on a display device, according to some implementations. In FIG. 9, the user may enter text content 2030 into a textbox 2032. The user may also select tags 2036 associated with the post, or schedule a date 2034 for when the post will be published. Alternatively, the user may also select the actual time of the day of publication of the post. These message information attributes may be part of the message information that is ultimately received at the server or servers performing method 1500, at block 1504.

As illustrated in FIG. 9, the graphical indicator 2140 may be a negative number that indicates not only that the most recent change to the social media decreased the predicted engagement score of the social media message, but also the numerical change to the predicted engagement score caused by the most recent change to the social media message. For example, in FIG. 9, the user may change the "Earliest Publish Date" field 2034 for a social media message, and the server may return the predicted engagement score for the social media message with this most recent change. The user's computing device then may display a "−0.3" as the graphical indicator 2140 to indicate that the predicted engagement score decreased by 0.3 points as a result of the user's change to the "Earliest Publish Date."

Figure 10:
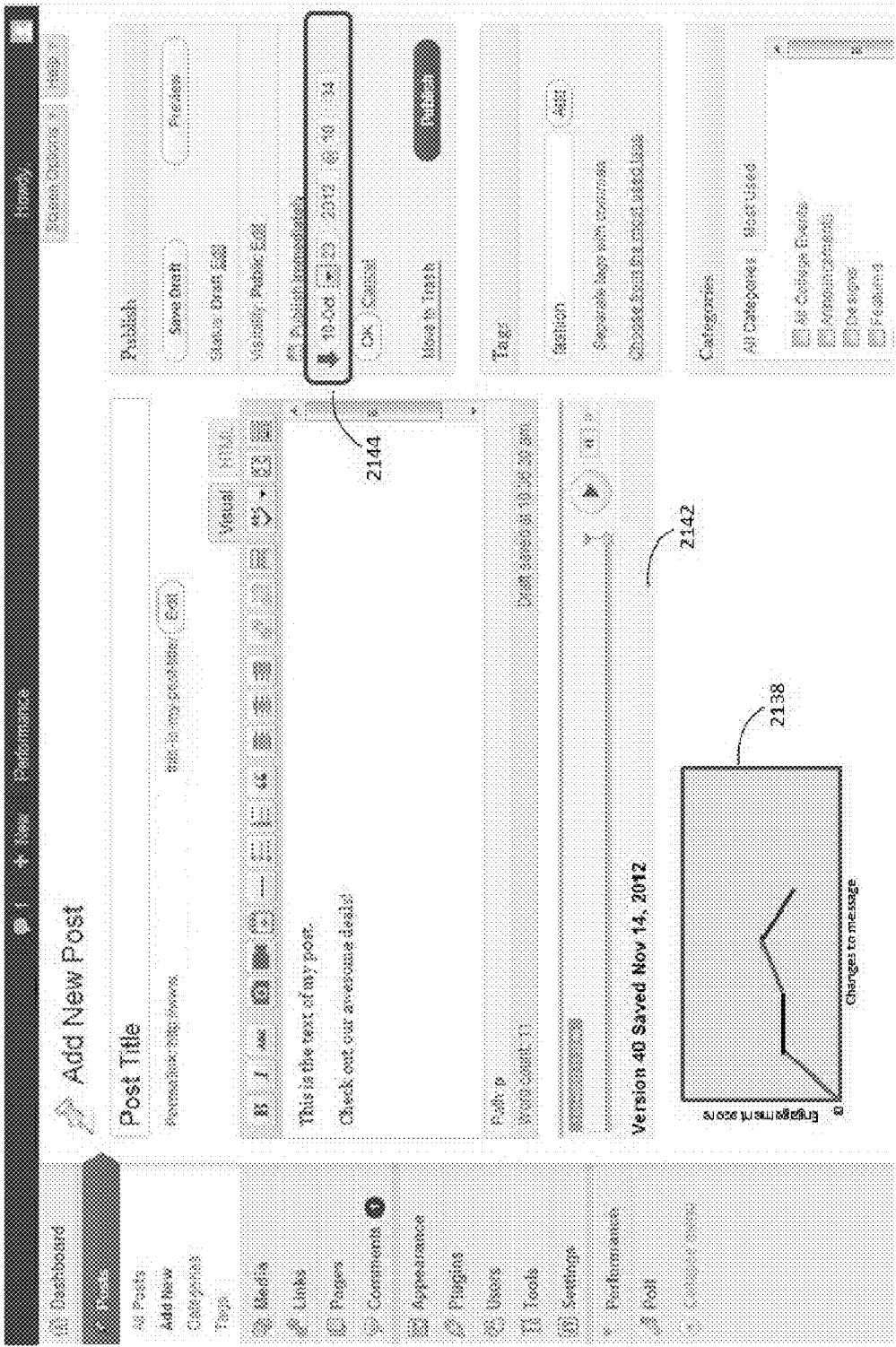
FIG. 10 shows an example of a presentation of negative feedback regarding a predicted engagement level of a social media message in a GUI as displayed on a display device, according to some implementations.

FIG. 10 shows an example of a presentation of negative feedback regarding a predicted engagement level of a social media message in a GUI as displayed on a display device, according to some implementations. Clicking on the graphical indicator may cause the user interface to display a different page containing a graph 2138 that displays how changes to the social media message affect predicted engagement scores. In this implementation, the page displayed may look substantially similar to the page previously displayed for composing the social media message, with a user input display containing a textbox, tags, categories, publishing date, author, recipient, and the like. The page may include a slider 2142 that the user may click on and slide through to see the previous changes to the social media message and the changes in the predicted engagement score corresponding to the previous changes. In some implementations, moving the slider to a particular position corresponding to a previous change to the social media message may cause the change 2144 to be highlighted. The segment of the graph 2138 corresponding to the previous change may also be highlighted. In another implementation, when the mouse pointer hovers over one segment of the graph, the user input display may highlight the portion of the social media message associated with the change that the segment of the graph corresponds to. For example, hovering over one segment of the graph may cause the publishing date of the user input display to be highlighted if the segment of the graph corresponds to a change in the publishing date.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for providing near real-time feedback to a first user of a social networking system when the first user is composing a social media message, the feedback indicating a predicted level of engagement with the social media message by a second one or more users of the social networking system, the method comprising:

receiving, at a server, message information regarding the social media message being composed by the first user at a computing device;

determining, using a prediction model, a predicted engagement score based on the message information, the predicted engagement score being an approximation of the predicted level of engagement with the social media message by the second one or more users of the social networking system; and sending data representing the predicted engagement score to the computing device to display a presentation in a user interface at which the social media message is being composed, the presentation including a graphical representation of the predicted engagement score and a graph presenting one or more previous predicted engagement scores for the social media message, the graphical representation including a graphical indicator proximate a region of the user interface at which the social media message is being composed, the graphical indicator configured to indicate at least a positive or a negative change to the predicted engagement score in response to a change to content of the social media message being composed.

2. The method of claim 1, wherein the message information includes one or more message information attributes, including: content of the social media message, a length of the social media message, a type of the social media message, an attachment of the social media message, a timestamp of the social media message, a scheduled date or time for sending the social media message, a link in the social media message, a number of links in the social media message, an identity of the first user, an identity of a recipient user, and subject matter of the social media message.

3. The method of claim 1, wherein the prediction model determines the predicted engagement score by:

identifying, based on previous social media messages and monitored engagement levels of the previous social media messages, one or more common message information attributes having a predicted impact on engagement, each common message information attribute having a weight value assigned by the prediction model corresponding to the respective predicted impact; and calculating the predicted engagement score based on a measure of the one or more common message information attributes in the message information of the social media message being composed.

4. The method of claim 3, wherein the monitored engagement level of a previous social media message is determined by one or more of: a number of likes, a number of dislikes, a number of shares, a number of comments, and a number of views.

5. The method of claim 3, wherein the prediction model is configured to: monitor the engagement levels of the previous social media messages, and adjust the weight values of the one or more common message information attributes identified by the prediction model.

6. The method of claim 1, wherein the predicted engagement score is a numerical approximation.

7. The method of claim 1, wherein the graphical indicator includes an arrow or a line indicating whether a most recent change to the content of the social media message increased or decreased the predicted level of engagement.

8. The method of claim 1, wherein the graphical indicator includes a positive number or a negative number indicating a numerical change to the predicted engagement score in response to a most recent change to the content of the social media message.

9. The method of claim 1, further comprising:
receiving user input data from the computing device, the user input requesting from the server previous predicted engagement scores for the social media message; and
sending the previous predicted engagement scores to the computing device, the graph indicating previous changes made to the message information and respective previous predicted engagement scores.

10. A computing system for providing near real-time feedback to a first user of a social networking system when the first user is composing a social media message, the feedback indicating a predicted level of engagement with the social media message by a second one or more users of the social networking system, the computing system comprising:
one or more processors operable to execute one or more instructions configured to cause:
processing message information received at a server regarding the social media message being composed by the first user at a computing device;
determining, using a prediction model, a predicted engagement score based on the message information, the predicted engagement score being an approximation of the predicted level of engagement with the social media message by the second one or more users of the social networking system; and
sending data representing the predicted engagement score to the computing device to display a presentation in a user interface at which the social media message is being composed, the presentation including a graphical representation of the predicted engagement score and a graph presenting one or more previous predicted engagement scores for the social media message, the graphical representation including a graphical indicator proximate a region of the user interface at which the social media message is being composed, the graphical indicator configured to indicate at least a positive or a negative change to the predicted engagement score in response to a change to content of the social media message being composed.

11. The computing system of claim 10, the one or more processors further operable to execute one or more instructions configured to cause:
identifying, based on previous social media messages and monitored engagement levels of the previous social media messages, one or more common message information attributes having a predicted impact on engagement, each common message information attribute having a weight value assigned by the prediction model corresponding to the respective predicted impact; and
calculating the predicted engagement score based on a measure of the one or more common message information attributes in the message information of the social media message being composed.

12. The computing system of claim 11, wherein the prediction model is configured to: monitor the engagement levels of the previous social media messages, and adjust the weight values of the one or more common message information attributes identified by the prediction model.

13. The computing system of claim 10, the one or more processors further operable to execute one or more instructions configured to cause:
receiving user input data from the computing device, the user input requesting from the server previous predicted engagement scores for the social media message; and
sending the previous predicted engagement scores to the computing device, the graph indicating previous changes made to the message information and respective previous predicted engagement scores.

14. A non-transitory tangible computer-readable storage medium storing instructions executable by a server to cause a method to be performed for providing near real-time feedback to a first user of a social networking system when the first user is composing a social media message, the feedback indicating a predicted level of engagement with the social media message by a second one or more users of the social networking system, the method comprising:
receiving, at a server, message information regarding the social media message being composed by the first user at a computing device;
determining, using a prediction model, a predicted engagement score based on the message information, the predicted engagement score being an approximation of the predicted level of engagement with the social media message by the second one or more users of the social networking system; and
sending data representing the predicted engagement score to the computing device to display a presentation in a user interface at which the social media message is being composed, the presentation including a graphical representation of the predicted engagement score and a graph presenting one or more previous predicted engagement scores for the social media message, the graphical representation including a graphical indicator proximate a region of the user interface at which the social media message is being composed, the graphical indicator configured to indicate at least a positive or a negative change to the predicted engagement score in response to a change to content of the social media message being composed.

15. The non-transitory tangible computer-readable storage medium of claim 14, wherein the server determines the predicted engagement score by:
identifying, based on previous social media messages and monitored engagement levels of the previous social media messages, one or more common message information attributes having a predicted impact on engagement, each common message information attribute having a weight value assigned by the prediction model corresponding to the respective predicted impact; and
calculating the predicted engagement score based on a measure of the one or more common message information attributes in the message information of the social media message being composed.

16. The non-transitory tangible computer-readable storage medium of claim 15, wherein the prediction model is configured to: monitor the engagement levels of the previous social media messages, and adjust the weight values of the one or more common message information attributes identified by the prediction model.

17. The non-transitory tangible computer-readable storage medium of claim 14, the method further comprising:
  receiving user input data from the computing device, the user input requesting from the server previous predicted engagement scores for the social media message; and
  sending the previous predicted engagement scores to the computing device, the graph indicating previous changes made to the message information and respective previous predicted engagement scores.

* * * * *